March 12, 1968     J. WEISS ET AL     3,372,582
CABLE TENSION INDICATOR
Filed June 25, 1965     2 Sheets-Sheet 1
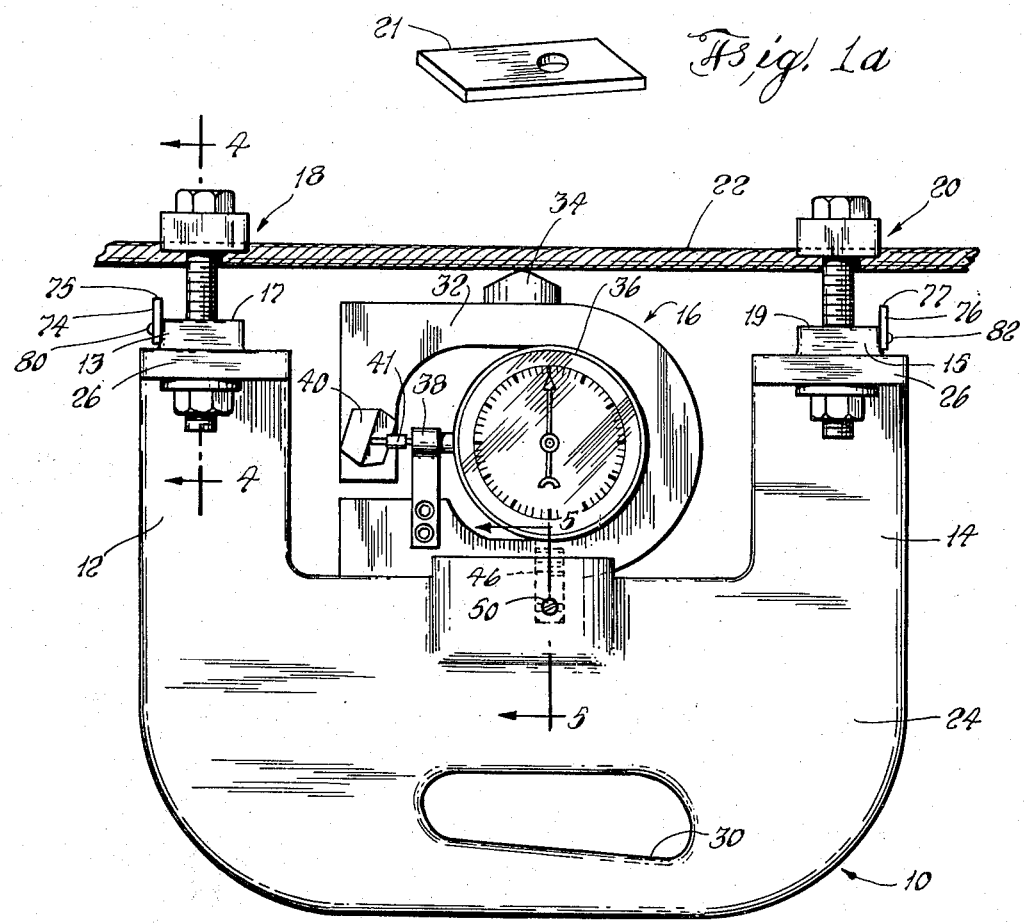
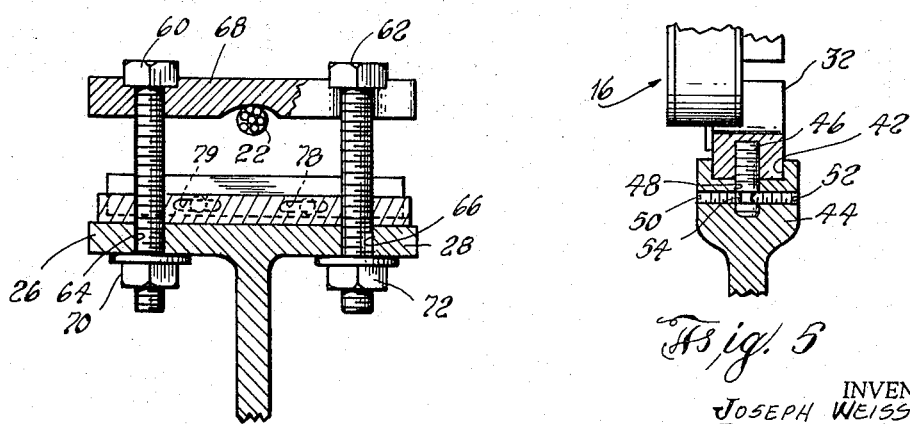
INVENTORS.
JOSEPH WEISS
JOHN G. MACCO
BY
John M. Pease
ATTORNEYS March 12, 1968
J. WEISS ET AL
3,372,582
CABLE TENSION INDICATOR
Filed June 25, 1965
2 Sheets-Sheet 2
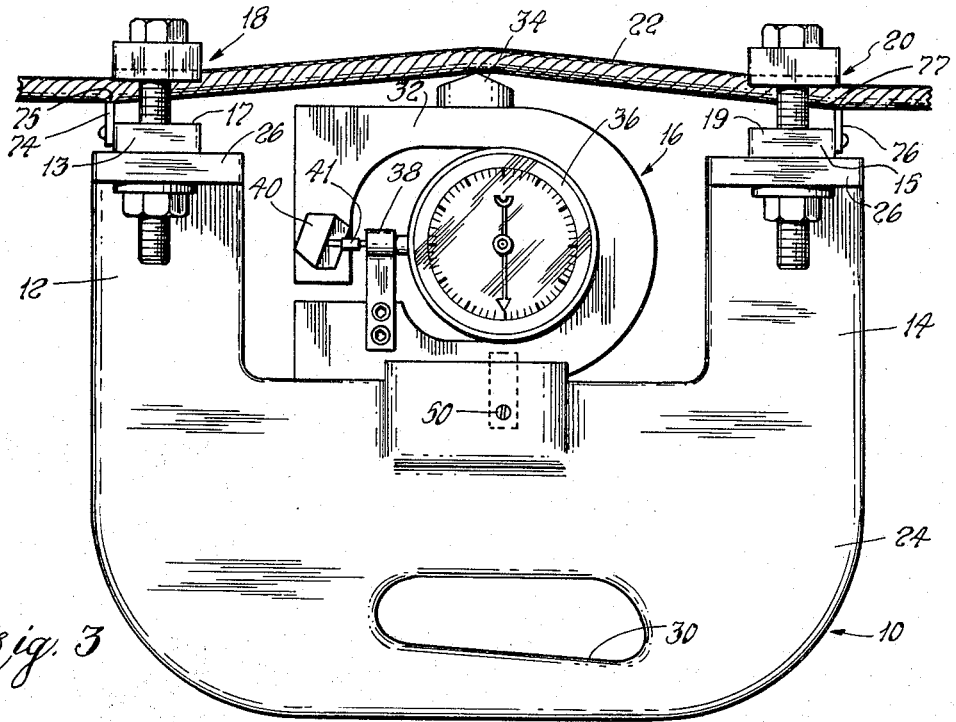
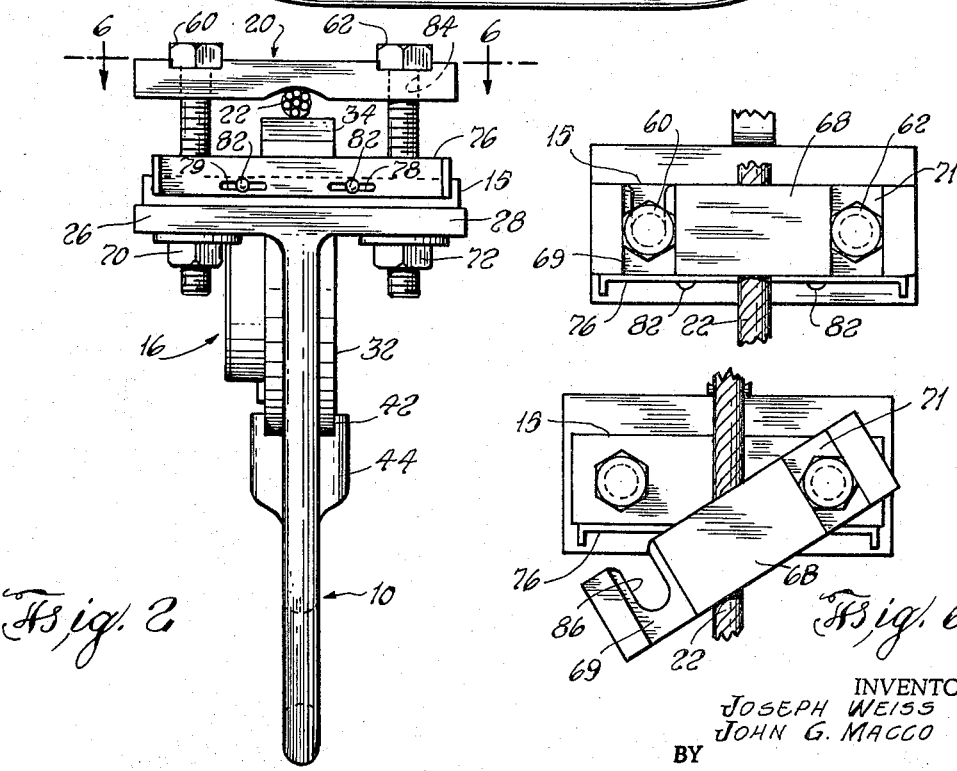
INVENTORS.
JOSEPH WEISS
JOHN G. MACCO
BY
*John M. Peone*
ATTORNEYS

United States Patent Office 3,372,582
Patented Mar. 12, 1968

3,372,582
CABLE TENSION INDICATOR
Joseph Weiss, 630 Stanley Ave., Brooklyn, N.Y. 11207, and John G. Macco, 375 1st Ave., Massapequa Park, N.Y. 11758
Filed June 25, 1965, Ser. No. 467,154
5 Claims. (Cl. 73—144)

ABSTRACT OF THE DISCLOSURE

A portable clamp type cable tension indicator which includes a frame structure having a pair of spaced apart clamps and a force type fulcrum gauge intermediate thereof. When the clamps are tightened on the cable, the fulcrum deflects the cable and the deflection of the cable and the force indicated by the gauge are a measure of the cable tension.

The invention described herein may be manufactured and used by or for the Government of the United States of America for governmental purposes without the payment of any royalties thereon or therefor.

This invention relates to tension measuring instruments and more particularly to a portable tension indicator readily attachable to and detachable from a cable under tension load to determine through calibrated charts the tension load on the cable being tested.

Conventional instruments for measuring load tension on cables have been found unsatisfactory as portable instruments because of weight, size and complexity of procedure in attachment and detachment to the cable being tested. Conventional instruments of this type have also been found unsatisfactory as regards difficulties in maintenance, reliability, initial cost and sensitivity. Other difficulties encountered in the use of conventional tension measuring instruments include the need for two or more persons to conduct the tension test and/or the need for personnel trained in complex instrumentation.

It is an object of this invention to provide an improved portable tension measuring instrument of minimum weight and size.

Another object is to provide an instrument of simple construction and readily adaptable to low cost manufacturing methods.

Another object is to provide an instrument which may be ecectively used by one man and which does not require personnel trained in complex instrumentation.

Another object is to provide an instrument which is sensitive to within ±2%, reliable and inherently of low cost maintenance characteristic.

The above and further objects and advantages of the invention will be apparent from the following specification and the attached drawings in which:

FIG. 1 is a front elevational view of an instrument incorporating the invention shown positioned on a cable to be tested, FIG. 1a is a prospective view of a spacer used with the instrument of FIG. 1.

FIG. 2 is a side elevational view of the device shown in FIG. 1,

FIG. 3 is a front elevational view of the device of FIG. 1 showing the cable under deflection during test.

FIG. 4 is a cross sectional view taken on line 4—4 of FIG. 1,

FIG. 5 is a cross sectional view taken on line 5—5 of FIG. 1, and

FIG. 6 are plan views taken on line 6—6 of FIG. 2 showing the cable clamp in closed and open positions.

It is to be noted that the device of the subject invention is particularly useful in the measurement of tension individually on plurality of cables supporting a load, such as elevator cables, which require testing and adjusting to evenly distribute the load on the several cables to avoid undue stress on any one cable. Since testing must be made on the job site, whether it be a building or ship elevator, the need for accuracy, reliability, and minimum weight, size and complexity is obvious.

With this thought in mind and referring to the drawings in detail, it is seen that the device shown therein comprises essentially a U-shaped frame 10 having legs 12 and 14, a compression type force gage 16 mounted on the frame between the legs 12 and 14 and clamping means 18 and 20 on the respective legs for securing the device to the cable 22 and for deflecting the cable as will be described.

The frame 10 is preferably of U-shape to accommodate the force gage 16 between the legs 12 and 14 and between the main body 24 of frame and the cable 22 while at the same time mantaining minimum bulk and weight in the frame. The legs 12 and 14 are each formed with oppositely disposed flange portions 26 and 28 to which the clamping means 18 and 20 is secured as will be described. The body 26 of the frame 10 may be apertured as at 30 to form a handgrip.

The force gage, generally indicated at 16, is a conventional compression force gage including a deflectable U-shaped force transmitting member 32 having a fulcrum portion 34 for engaging the cable 22 and a dial readout element 36 supported from the member 32 as by hanger 38 and operated through a cam 40 from which a plunger 41 of the gage is operated.

The gage 16 is mounted on the frame 10 by positioning one leg of the U-shaped member 32 in a groove 42 formed in an enlarged section 44 of the frame 10 to prevent lateral movement of the gage. The gage 16 is further secured in position by a stud 46 threaded into the member 32 and extending into a recess 48 in the frame 10. The stud 46 is secured in position by lock pins 50 and 52 threaded through aligned apertures in the frame section 44 and extending into an annular groove 54 formed in the stud 46 adjacent its unthreaded end. Thus, gage 16 may be detached from frame 10 and another gage of different pressure range substituted therefor.

The adjustable clamping means 18 and 20 each comprise a pair of bolts 60 and 62 (best seen in FIG. 4) passing through apertures 64 and 66 in the respective frame flanges 26 and 28 together with swinging type steel links 68 and securing nuts 70 and 72. Slidable feeler gages 74 and 76 (see FIG. 1) are mounted respectively on bossed portions 13 and 15 of legs 12 and 14 with the one edge of each feeler gage projecting outwardly from a flat force surface of its associated boss in the direction of the cable 22, the flat force surfaces being indicated at 17 and 19. Elongated slots (see FIG. 4) 79 and 78 in the feeler gages and screws 80 and 82 (see FIG. 1) provide for slidably mounting the feeler gages to the respective frame legs through the boss portions 13 and 15.

As will be noted in FIGS. 1 and 3 the fulcrum 34 extends outwardly beyond the free outer edges 75 and 77 of the feeler gages 74 and 76, the outer edges of the feeler gages being in a common horizontal plane as viewed in FIGS. 1 and 3.

Thus, in order to move the cable 22 into engagement with the outer free edges of the feeler gages the cable must be deflected about the fulcrum 34 as shown in FIG. 3.

It is understood that the subject tension indicator is to be used in conjunction with calibration curves developed for specific size and nature of cables. Thus, the calibration curves obtained from test samples of the specific cable indicate the force required to deflect the cable a given amount vs. the cable load tension.

In use of the subject tension indicator the amount of deflection of cable is determined by the position of the fulcrum 34 with respect to the plane of the outer free edges 75 and 77 of the feeler gages 74 and 76. Thus, the deflection can be varied by substituting pairs of feeler gages of different equal widths but different width from those of other gages. Fulcrum 34 may also be made detachable such that fulcrum members of different length may be substituted one for another for the same purpose and the fulcrum member may be made extendable by adjustably screwing and detent locking the fulcrum in adjusted position. Also as shown in FIG. 1a, a spacer element 21 may be provided for positioning between the gage 16 and the frame 10 to vary the deflection of the cable 22. As shown in FIGS, 2 and 6 each link 68 is apertured as at 84 adjacent one end to receive its associated bolt 62 and slotted as at 86 adjacent its other end to receive its associated bolt 60. Further the face of each link adjacent the heads of bolts 60 and 62 are grooved and recessed as at 69 and 71 to prevent one bolt from turning when the nuts 70 and 72 are tightened.

In operation the links 68 are swung to open position to admit the cable 22 between the bolts 60 and 62 and are then closed thereby to encompass the cable. The slotted end of each link slides its associated bolt. Thereafter, the clamp bolt nuts 70 and 72 are tightened to deflect the cable about the fulcrum 34 and cause the cable to engage both feeler gages 74 and 76. Contact can be determined by a noticeable drag on the slidable feeler gages as they are moved. The deflection force value on the force gage is then read and converted to cable tension by use of an appropriate calibration curve as previously described.

The frame of the device is preferably made of aluminum or other light metal. There are no hydraulic or air operated parts or electrical circuitry in the device, thereby reducing maintenance and weight to a minimum. No skilled personnel are required to take a reading. One need simply read the force gage. The device can be attached and detached quickly and easily by one man. The device is compact and relatively small as compared to conventional devices provided for the same function. Thus, the device in accordance with the subject invention provides all of the objects and advantages hereinbefore mentioned.

It will be understood that various changes in details, materials and arrangements of parts which have been herein described and illustrated in order to explain the nature of the invention, may be made by those skilled in the art within the principle and scope of the invention as expressed in the appended claims.

We claim:

1. A clamp type portable measuring instrument for use with calibration curves in determining the tension in a mechancal cable under tension comprising:

a frame being U-shaped to provide spaced depending legs and an intermediate recessed portion between said legs, a pair of clamps mounted on said legs and adapted to encompass the cable at spaced points therealong when attached thereto, said clamps being adjustable to draw the cable in the direction of said frame, a compression type force gauge mounted on said recessed portion of said frame and having a force transmitting fulcrum positioned to engage said cable intermediate said spaced clamping points to deflect said cable as said clamps are tightened, and a feeler gauge slidably mounted on each of said frame legs adjacent said clamp to engage said cable and indicate proper adjustment of said clamps for a predetermined desired deflection of said cable.

2. A measuring instrument as set forth in claim 1, said feeler gages being detachably mounted to said frame legs for the substitution of pairs of feeler gages of selective width to provide selectivily in the degree of deflection to be applied to the cable by said adjustable clamps.

3. A measuring instrument as set forth in claim 1, said force gage being mounted to said frame through detachable spacer means such that by varying the thickness of spacer selected the degree of cable deflection required to cause said cable to engage said feeler gages may be selectively varied.

4. A measuring instrument according to claim 1, said fulcrum being selectively replaceable by fulcrums of different length to selectively vary the deflection of said cable.

5. A meausring instrument according to claim 2, said frame having an enlarged center section grooved to receive a portion of said force gage to prevent lateral motion thereof, and stud means for detachably securing said gage to said frame.

References Cited

UNITED STATES PATENTS

| | | | |
|---|---|---|---|
| 1,771,339 | 7/1930 | Martin | 73—144 |
| 1,833,195 | 11/1931 | Albright | 73—144 |
| 2,809,518 | 10/1957 | Grandstaff | 73—144 |

FOREIGN PATENTS

| | | |
|---|---|---|
| 596,531 | 8/1925 | France. |
| 666,625 | 5/1929 | France. |

RICHARD C. QUEISSER, *Primary Examiner.*

JAMES GILL, *Examiner.*

JAMES H. WILLIAMSON, *Assistant Examiner.*